B. W. JANSSEN.
AUTO DRIVE MECHANISM.
APPLICATION FILED AUG. 17, 1909.
995,009.
Patented June 13, 1911.
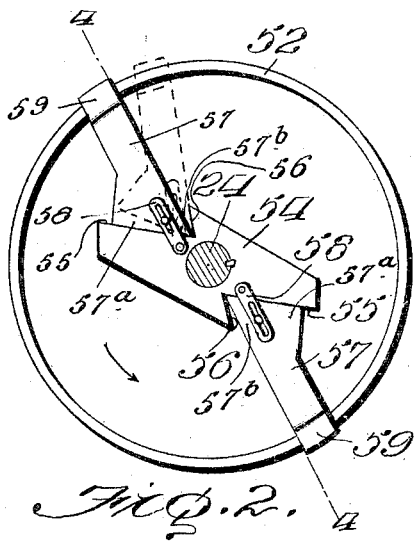
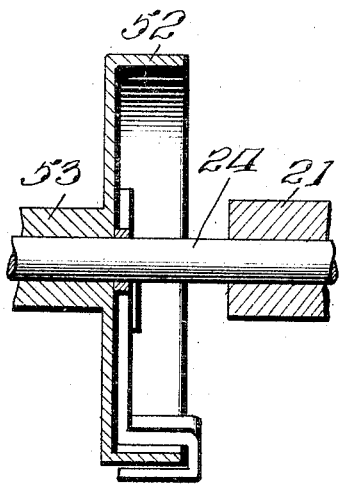
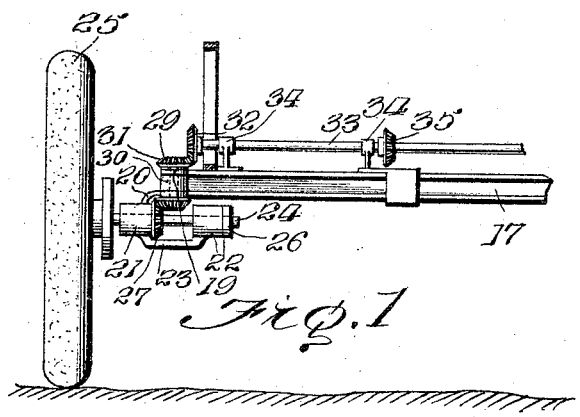
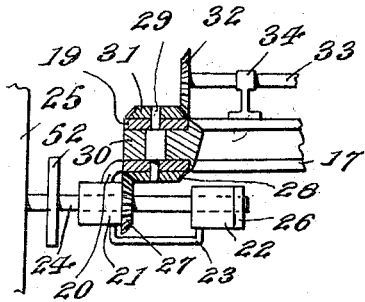
Witnesses
Inventor
B. W. Janssen
By
Attorneys

UNITED STATES PATENT OFFICE.

BEN W. JANSSEN, OF WENTWORTH, SOUTH DAKOTA.

AUTO DRIVE MECHANISM.

995,009.  Specification of Letters Patent.  Patented June 13, 1911.

Application filed August 17, 1909. Serial No. 513,277.

*To all whom it may concern:*

Be it known that I, BEN W. JANSSEN, citizen of the United States, residing at Wentworth, in the county of Lake and State of South Dakota, have invented certain new and useful Improvements in Auto Drive Mechanisms, of which the following is a specification.

This invention relates broadly to motor vehicles, referring particularly to a power transmission for the same.

An object of the invention is to provide an improved clutch in connection with each of the front wheels of the vehicle wherein the independent racing of the wheels is permitted to make turns in either direction and at the same time to transmit the power from the medium to the wheels.

A further object of the invention resides in the provision of a peculiar arrangement of the gears and shafting, whereby the front wheels are permitted to move into various vertical planes to effect the turning and simultaneous driving thereof.

For a full understanding of the invention reference is to be had to the following description and accompanying drawings, in which:—

Figure 1 is a front elevation of one end of the front axle having the wheel and its adjacent mechanism applied thereto. Fig. 2 is a side elevation of the improved clutch employed in connection with the transmission. Fig. 3 is a section on the line 4—4 of Fig. 2. Fig. 4 is a sectional view of the front axle and its adjacent parts.

Corresponding and like parts are referred to in the following description and indicated in all the views of the accompanying drawings by the same reference characters.

Referring to the drawings the numeral 17 designates the front axle which is of any approved form and disclosed in the drawings constructed of an I-beam. Pairs of vertically spaced collars 19 are mounted for rotation against the opposite ends of the axle 17. The lower collar 19 of each pair carries a depending and curved arm 20 upon the lower end of which is mounted a horizontal bearing 21. The bearing 21 is arranged in longitudinal alinement with a second bearing 22 spaced inwardly therefrom and held in such position by a web 23. The web 23 is arched downwardly from the adjacent ends of the bearings 21 and 22 to accommodate the gearing which will be hereinafter described. The bearings 21 and 22 at each end of the axle 17 carry a spindle 24 upon the outer end of which is mounted the front wheel 25. The spindle 24 is held in position by a nut 26, or the like, which is fixed upon the inner end of the spindle to prevent the longitudinal outward movement of the same.

The improved means for transmitting the power to the front wheel 25 comprises the positioning of a beveled pinion 27 upon the spindle 24 between the bearings 21 and 22. A second beveled pinion 28 meshes with the pinion 27 and is carried upon the lower end of a vertical shaft 29 journaled through the spaced collars 19. The extremity of the axle 17 is provided with a horizontally disposed eye 30 engaging between the spaced collars 19 and receiving the central portion of the vertical shaft 29. The upper end of the vertical shaft 29 is provided with a beveled pinion 31 meshing with a beveled pinion 32 carried upon the outer end of a horizontal shaft 33. The shaft 33 is mounted in suitable bearings 34 upon the upper edge of the axle 17. The shaft 33 is provided at its central portion with a gear 35, by means of which the power medium is connected to the shaft 33.

Upon each of the spindles 24 a clutch mechanism is mounted for the purpose of admitting of the independent racing of the wheels 25. The mechanism comprises a drum 52 rigid upon the hub 53 of the wheel and through which the spindle 24 is loosely journaled. The spindle 24 carries a block 54 rotatable within the drum 53 and formed with oppositely disposed straight edges 55 terminating in shoulders 56 having diagonally and outwardly extending edges. The straight edges 55 support the inner ends of the arms 57 projecting radially from the block 54 and having inner beveled ends seating against the straight edges 55. The arms 57 are loosely connected to the block 54 by links 58. The links 58 are pivotally mounted upon the block 54 and are loosely connected to the inner ends of the arms 57. The arms 57 are adapted for slight upward movement from the edges 55 to strike the shoulders 56. The outer ends of the arms 57 are provided with shoes 59 formed of U-shaped members overlapping the edge of the drum 52 for binding against the opposite faces of the same. The shoes 59 are of U-form so as to effect the binding action of the same upon the opposite sides of the drum 52 and insure the gripping of the shoes.

In the operation of the improved transmission, when the beveled pinion 35 is turned to revolve the shaft 33 the gear 32 turns the gear 31 and sets the vertical shaft 19 in motion. The shaft 19 turns the intermeshing gears 27 and 28 revolving the spindle 24. When the spindle 24 is driven in a forward direction, or in the direction indicated by the arrow in Fig. 2, the block 54 is carried therewith. The block 54 rotates freely to carry the shoulders 56 into engagement against the inner edges of the arms 57, as disclosed in dotted lines in Fig. 2. Further rotation of the block 54 binds the shoulders 56 against the arms 57 and swings the inner ends of the arms 57 out to dispose the inner walls of the shoes 59 eccentric to the drum 52. This action produces the binding of the ends of the shoes 59 against the opposite faces of the drum 52. As the shoulders 56 rest against the inner ends of the arms, and as the arms 57 are held from outward swinging movement by the shoes 59, further movement of the block 54 effects the rotation of the drum 52 therewith, binding the arms 57 upon the drum 52. When the drum 52 overruns the spindle 24 the shoes 59 are carried with the drum until the inner walls of the shoes assume a position concentric to the sides of the drum 52. The shoes 59 are held in this position by the seating of the bases or inner ends 57ª of the arms against the straight edges 55 of the blocks, and the resting of the points 57ᵇ of the arms against the shoulders 56. The links 58 are of sufficient length to admit of the free movement of the arms 57. The links 58 also serve the function of retaining the arms 57 within the drum 52.

Having thus described the invention what is claimed as new is:

1. A power transmission including a front axle having eyes formed at its opposite ends, a horizontal shaft carried by the axle, vertical shafts engaging through the eyes, intermeshing pinions disposed upon the horizontal and vertical shafts, spaced collars positioned against the sides of the eyes and about the vertical shafts, depending arms carried by the lower ones of said collars and extending outwardly from the same, spaced bearings arranged in horizontal alinement upon the arms, spindles journaled through the bearings, intermeshing pinions carried upon the lower ends of the vertical shafts and on the spindles for communicating motion thereto, wheels carried by the spindles, and clutches interposed between the spindles and the wheels.

2. A transmission mechanism including a front axle, a horizontal shaft disposed across the upper edge of the front axle, said axle having eyes formed at its opposite ends with vertical apertures therethrough, vertical shafts engaging through the eyes, pinions carried at the extremities of the horizontal shaft and said vertical shafts for communicating motion therebetween, spaced collars loosely engaging against the opposite sides of the eyes and about the vertical shafts, downwardly curved arms extending outwardly from the lower ones of said collars, spaced bearings carried in horizontal alinement on said arms, spindles extending through the bearings to swing with the collars, clutches carried upon the spindles, and wheels mounted upon said clutches.

In testimony whereof I affix my signature in presence of two witnesses.

BEN W. JANSSEN. [L.S.]

Witnesses:
JOHN W. JOHNSON,
J. R. MARTIN.